United States Patent
Kakas et al.

(10) Patent No.: US 12,441,394 B2
(45) Date of Patent: Oct. 14, 2025

(54) POWER BOOST DURING DEGRADATION OF A STEERING SYSTEM

(71) Applicants: thyssenkrupp Presta AG, Eschen (LI); Honda Motor Co., Ltd., Tokyo (JP)

(72) Inventors: Péter Kakas, Budapest (HU); Miklós Arányi, Rebstein (CH); Takaya Yamaguchi, Wako (JP); Yosuke Ojima, Wako (JP); Takashi Kuribayashi, Wako (JP)

(73) Assignees: THYSSENKRUPP PRESTA AG, Eschen (LI); HONDA MOTOR CO., LTD., Tokyo (JP)

( * ) Notice: Subject to any disclaimer, the term of this patent is extended or adjusted under 35 U.S.C. 154(b) by 34 days.

(21) Appl. No.: 18/612,477

(22) Filed: Mar. 21, 2024

(65) Prior Publication Data
US 2024/0227924 A1    Jul. 11, 2024

Related U.S. Application Data

(63) Continuation of application No. PCT/EP2021/076002, filed on Sep. 22, 2021.

(51) Int. Cl.
*B62D 5/04* (2006.01)
*B62D 6/00* (2006.01)

(52) U.S. Cl.
CPC ........... *B62D 5/0484* (2013.01); *B62D 6/008* (2013.01)

(58) Field of Classification Search
CPC .. B62D 5/0484; B62D 5/0481; B62D 5/0487; B62D 5/049; B62D 5/0493; B62D 5/001; B62D 6/008
See application file for complete search history.

(56) References Cited

U.S. PATENT DOCUMENTS

| | | | |
|---|---|---|---|
| 6,041,884 A * | 3/2000 | Shimizu | B62D 5/0481 180/443 |
| 8,849,498 B2 * | 9/2014 | Lee | B62D 5/049 701/30.7 |
| 2004/0193344 A1 * | 9/2004 | Suzuki | B60T 8/885 180/443 |
| 2010/0076650 A1 * | 3/2010 | Spadafora | B62D 9/005 701/43 |
| 2023/0017618 A1 * | 1/2023 | Albrecht | B62D 6/008 |
| 2023/0040044 A1 * | 2/2023 | Kakas | B62D 5/0484 |

FOREIGN PATENT DOCUMENTS

FR          2927596 A3 *  8/2009  ........ B60W 50/029

OTHER PUBLICATIONS

Georges (Year: 2009).*
Official Communication issued in International Patent Application No. PCT/EP2021/076002, mailed on Jul. 5, 2022.

* cited by examiner

*Primary Examiner* — George C Jin
(74) *Attorney, Agent, or Firm* — Keating & Bennett, LLP

(57) ABSTRACT

A method of controlling a steering system for a vehicle includes determining a state of performance degradation of the steering system, determining a vehicle situation, determining if a performance of the steering system in the determined state of performance degradation is sufficient for the determined vehicle situation, and, if the performance of the steering system is not sufficient, modifying the state of performance degradation by decreasing a degradation level for a period of time.

14 Claims, 2 Drawing Sheets

POWER BOOST DURING DEGRADATION OF A STEERING SYSTEM

CROSS REFERENCE TO RELATED APPLICATIONS

This application claims the benefit of priority to PCT Application No. PCT/EP2021/076002 filed on Sep. 22, 2021. The entire contents of this application is hereby incorporated herein by reference.

BACKGROUND OF THE INVENTION

1. Field of the Invention

The present invention relates to methods to control steering systems of vehicles.

2. Description of the Related Art

In motor vehicles with electromechanical steering systems degradation is possible and allowed. For steering systems of autonomous vehicles and/or steer-by-wire systems, the requirements and the architecture is different. One of the main requirements is that the steering system has to be fault tolerant, which means that if one failure occurs, the steering system has to operate further, providing the main functionality.

If degradation in any portion of the steering system occurs, the main functionality might not be sufficient for full steering functionality in all driving situations. For example, if one side of a redundant architecture is switched off or the system is degraded suddenly, it could be that there is not enough power to finish the steering maneuver. This could be insufficient if the maneuver is an emergency maneuver.

SUMMARY OF THE INVENTION

Example embodiments of the present invention provide methods to control steering systems of vehicles to ensure steering of the vehicles in all driving situations even after degradation of the steering systems.

A method of controlling a steering system for a vehicle includes (a) determining a state of performance degradation of the steering system, (b) determining a vehicle situation, (c) determining if a performance of the steering system in the determined state of performance degradation is sufficient for the determined vehicle situation, and (d) if the performance of the steering system is determined to be not sufficient, modifying the state of performance degradation by decreasing a degradation level for a period of time.

This method enables enough power of a steering system to be reliably provided for all vehicle situations even though the steering system is degraded. Thus, situations that require performance such as emergency handling can be handled despite degradation of steering.

Preferably, the vehicle situation determined in step b) is an emergency situation of the vehicle which has a high-performance demand.

It is advantageous, if in step d), the degradation level is decreased to a level with sufficient performance of the steering system to provide full steering functionality for the vehicle situation.

In order to prevent damage of the steering system, the decrease of degradation level in step d) is carried out only for a short period of time sufficient for the vehicle situation to change.

The determination of the vehicle situation in step b) can be based on one or more of a vehicle speed, a lateral acceleration, a longitudinal acceleration, a yaw rate, feedback actuator signals, or road wheel actuator signals.

In step d), the modifying of degradation can be carried out dependent on the state of performance degradation of the steering system.

Preferably, in step d), the degradation is gradually decreased.

The rate of decrease can be a tunable parameter and/or can be vehicle speed dependent.

It is preferred that the degradation is decreased up to a limit value, which is a tunable parameter and which depends on a original degradation level and/or on an vehicle speed.

Preferably, in step d), the period of time is a tunable parameter, which depends on an original degradation level and/or a vehicle speed.

In an advantageous example embodiment, after step d), the degradation is increased back to an original state of performance degradation determined in step a). In this case, it is preferred that a rate of increase in step d) is a tunable parameter and/or is vehicle speed dependent.

Further, a steer-by-wire steering system or an electric power assisted steering system for a vehicle with a controller, configured to carry out the above-mentioned method is provided.

The above and other elements, features, steps, characteristics and advantages of the present invention will become more apparent from the following detailed description of the example embodiments with reference to the attached drawings.

BRIEF DESCRIPTION OF THE DRAWINGS

Example embodiments of the present invention will now be described with reference to the drawings.

DETAILED DESCRIPTION OF THE EXAMPLE EMBODIMENTS

Figure 1:
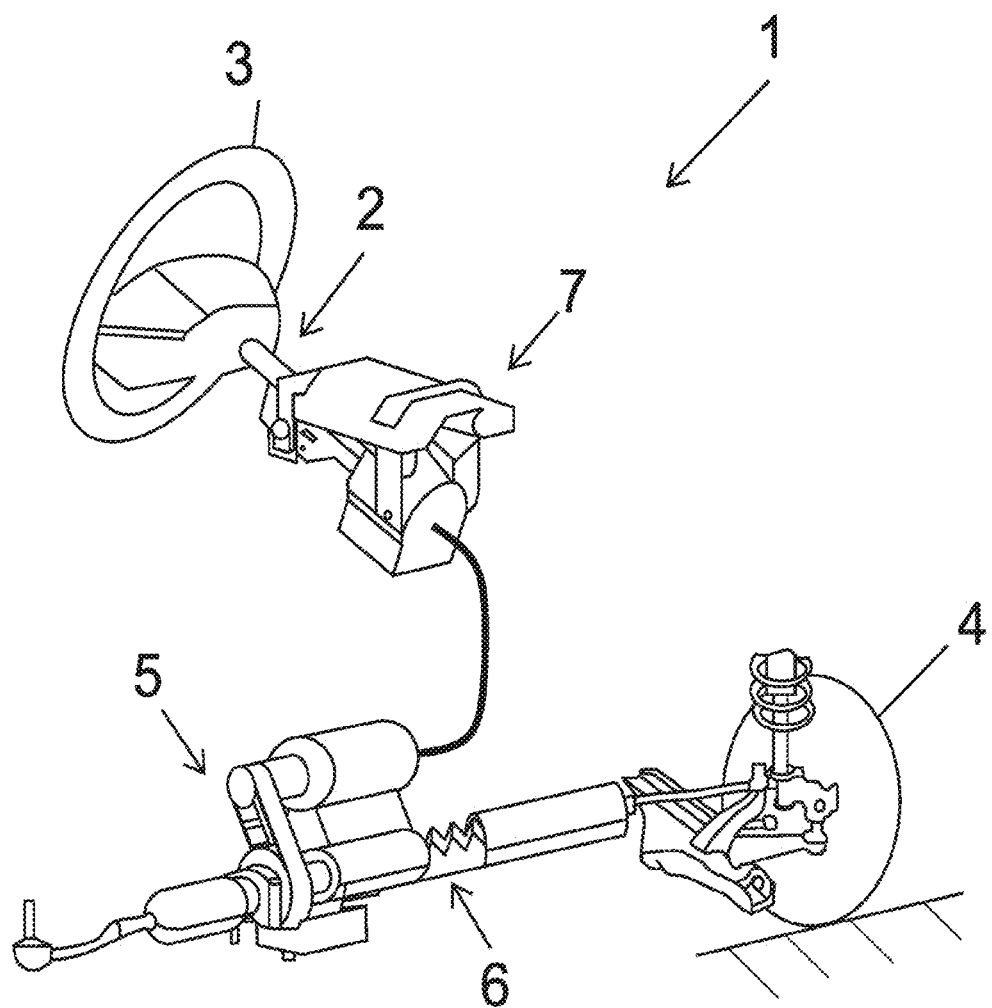
FIG. 1 is a schematic view of a steer-by-wire-steering system.

FIG. 1 is a schematic drawing of a steer-by-wire steering system 1 with a steering shaft 2 connected to a steering wheel 3. There is no mechanical connection between the steering wheel 3 and the road wheels 4. A road wheel actuator 5 operates a gear rack 6 via a recirculating ball gear.

When a driver operates the steering wheel 3, the steering shaft 2 is rotated, which is detected by a shaft sensor, which is not shown in the drawings. A controller is configured or programmed to calculate an operation signal for the road wheel actuator 5 from the signal detected by the shaft sensor. By operating gear rack 6 with the operation signal, the road wheels 4 are turned. At the same time, forces introduced in the gear rack 6 from the road wheels 4 are recognized by another sensor not shown in the drawings, and a feedback signal is calculated, which is applied to the steering shaft 2 by a steering wheel actuator 7, also called feedback actuator, so that the operator can recognize the feedback in the steering wheel 3.

If a malfunction in the system occurs, degradation might occur and result in performance degradation of the steering system. Depending on the degradation function, it might be possible that in a specific degraded mode, the system cannot carry out the present driving maneuver, e.g., finish the driving maneuver.

Figure 2:
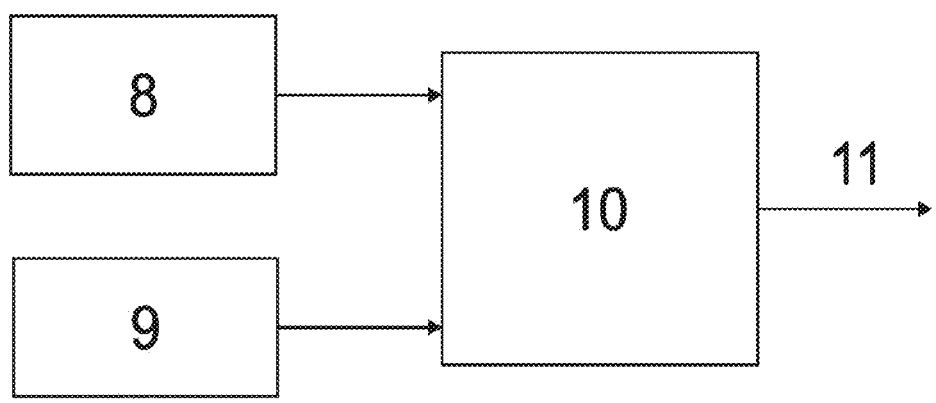
FIG. 2 is a block diagram representing a method for controlling the steering system.

According to the method shown in FIG. 2, a degradation mode or state 8 and a current vehicle situation or maneuver 9 are determined. The information is sent to a decision-making unit 10 (e.g., controller or processor), which analyses if the performance of the steering system in the determined degradation mode is sufficient for the vehicle situation or maneuver. If the performance available in the determined degraded mode is too low, the degradation is gradually decreased, which increases the performance of the steering system to a minimum required for the current vehicle situation or maneuver. This modification of the degradation 11 is carried out for a short period of time sufficient to finish the maneuver, especially in emergency situations.

In detail, the determination of vehicle situations or vehicle maneuvers 8 can be based on vehicle signals such as vehicle speed, lateral acceleration, longitudinal acceleration, yaw rate, etc. Whether the vehicle is in a situation that requires the performance can be decided based on the basis of steering system internal signals such as signals from a feedback actuator and/or a road wheel actuator, e.g., angle, angle speed, reference and/or estimated motor torque as well as measured and or estimated driver torque, which can be also used for situation detection.

The modification of degradation 11 is carried out dependent on the state of performance degradation of the steering system. For example, it is possible that at least one portion of the system is switched off or degraded to zero power. Other portion(s) of the system shall than be modified to provide more power. In case that all portions of the system are operating but in degraded mode, the degradation of all portions of the system shall be modified to provide more power.

The degradation can then be gradually decreased to gradually increase the available power. The rate of decrease can be a tunable parameter and/or it can be vehicle speed dependent. The limit value for the decrease can be a tunable parameter as well, which can depend on the original degradation level and/or on the vehicle speed.

The modified lower degradation level can be applied temporarily for a short period of time. The period of time can be a tunable parameter, which can depend on the original degradation level and/or the vehicle speed. After the above-mentioned period of time has elapsed, the degradation is gradually increased back to the original value resulting in a decrease of the available power. The rate of increase can be a tunable parameter and/or it can be vehicle speed dependent.

Although a modification in degradation could damage the system, it makes it possible to maintain maneuverability in all situations by increasing the power level of the steering system in a situation that requires performance such as emergency handling.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method to control a steering system for a vehicle, the method comprising:
    (a) determining a state of performance degradation of the steering system;
    (b) determining a vehicle situation;
    (c) determining if a performance of the steering system in the determined state of performance degradation is sufficient for the determined vehicle situation; and
    (d) if the performance of the steering system is determined to be not sufficient, modifying the state of performance degradation by decreasing a degradation level for a period of time.

2. The method according to claim 1, wherein the vehicle situation determined in step b) is an emergency situation of the vehicle.

3. The method according to claim 1, wherein in step d), the degradation level is decreased to a level with sufficient performance of the steering system to provide full steering functionality for the determined vehicle situation.

4. The method according to claim 1, wherein the decrease of degradation level in step d) is carried out for a period of time sufficient for the vehicle situation to change.

5. The method according to claim 1, wherein the determination of the vehicle situation in step b) is based on one or more of a vehicle speed, a lateral acceleration, a longitudinal acceleration, a yaw rate, feedback actuator signals or road wheel actuator signals.

6. The method according to claim 1, wherein in step d), the modifying of degradation is carried out dependent on the state of performance degradation of the steering system.

7. The method according to claim 1, wherein in step d), the degradation is gradually decreased.

8. The method according to claim 7, wherein a rate of degradation decrease is at least one of a tunable parameter or is vehicle speed dependent.

9. The method according to claim 7, wherein the degradation is decreased up to a limit value, which is a tunable parameter and which depends on at least one of an original degradation level or a vehicle speed.

10. The method according to claim 1, wherein, in step d), the period of time is a tunable parameter dependent on at least one of an original degradation level or a vehicle speed.

11. The method according to claim 1, wherein after step d), the degradation is increased back to an original state of performance degradation determined in step a).

12. The method according to claim 11, wherein a rate of increase during step d) is at least one of a tunable parameter or is vehicle speed dependent.

13. A steer-by-wire steering system configured to perform the method according to claim 1.

14. An electric power assisted steering system for a vehicle with a controller configured to perform the method according to claim 1.

* * * * *